United States Patent [19]

Taniguchi et al.

[11] 3,745,540

[45] July 10, 1973

[54] SEMICONDUCTOR MEMORY

[75] Inventors: Kenji Taniguchi, Kodaira; Atsuo Hotta; Ichiro Imaizumi, both of Kokubunji; Kouetsu Chiba, Kokubunji, all of Japan

[73] Assignee: Hitachi, Ltd., Tokyo, Japan

[22] Filed: Sept. 24, 1971

[21] Appl. No.: 183,375

[30] Foreign Application Priority Data

Sept. 25, 1970 Japan ................................ 45/83850

[52] U.S. Cl. ........................... 340/173 FF, 307/238

[51] Int. Cl. ............................................ G11c 11/40

[58] Field of Search ............... 340/173 FF; 307/238, 307/279, 291, 292

[56] References Cited

UNITED STATES PATENTS 3,537,078 10/1970 Pomeranz ...................... 340/173 FF

*Primary Examiner*—James W. Moffitt

*Attorney*—Craig and Antonelli

[57] ABSTRACT

A switched impedance element, presenting a high or a low impedance value in response to whether or not an address voltage is applied thereto, is connected with each collector of a pair of transistors which are mutually coupled together in such a manner that the collector and the base of one transistor are connected with the base and the collector of the other transistor, respectively, to thereby form a memory cell. A pair of digit lines are connected with the emitters of the pair of transistors and an address line is connected with the switched impedance elements connected with the respective collectors. The address voltage is superposed on a collector bias voltage and applied to the address line when the memory cell is to be selected, whereby the low impedance is loaded on each of the collectors of the pair of transistors when the are selected.

29 Claims, 20 Drawing Figures

SEMICONDUCTOR MEMORY

BACKGROUND OF THE INVENTION

The present invention relates to a semiconductor memory and more particularly to improvements in a memory cell composed of two transistors in combination.

BACKGROUND OF THE INVENTION

Figure 1:
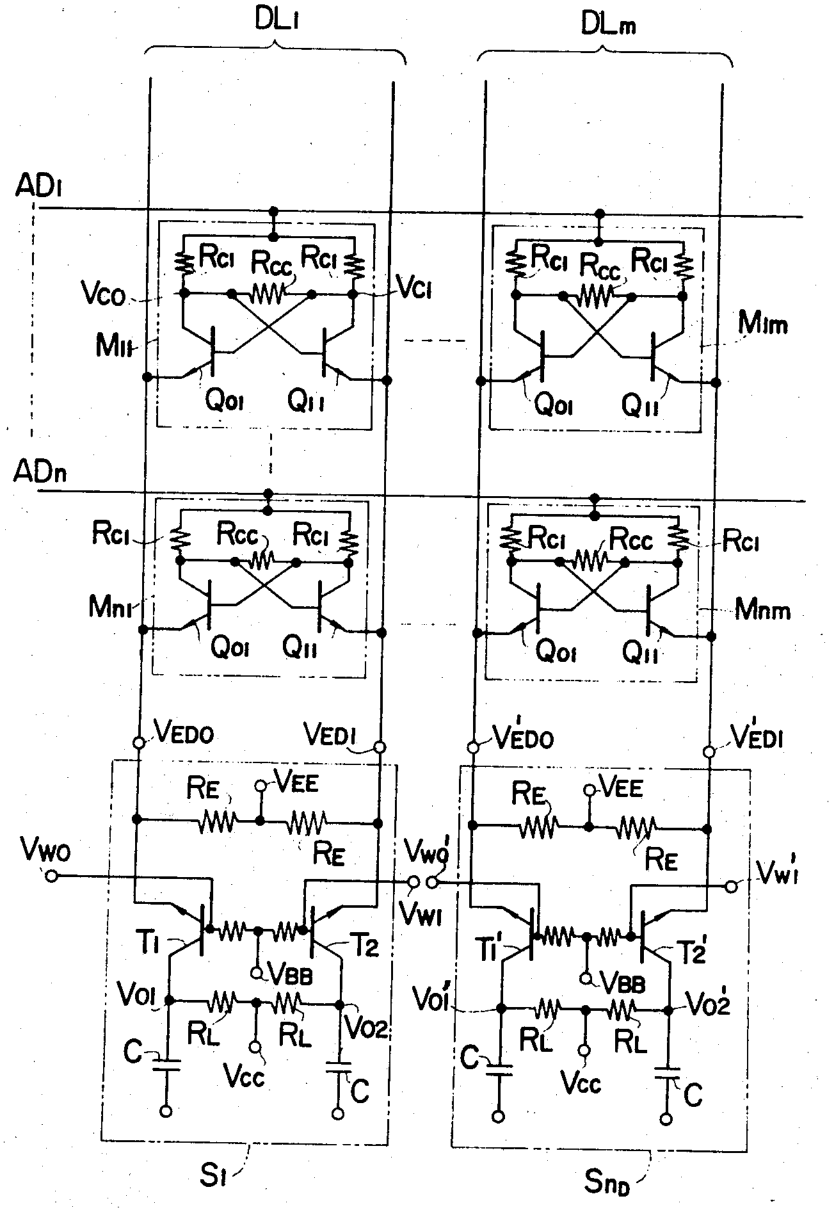
FIG. 1 PRIOR ART
FIG. 1 is a diagram showing an example of a prior art semiconductor memory.

It has hitherto been known that the memory cell composed of two transistors in combination is the most suitable as a memory cell for use in a semiconductor memory of large capacity, since its occupying area is small when it is made into an integrated circuit. A concrete construction thereof is shown in FIG. 1.

In the figure, reference characters M11, ....M*nm* designate memory cells, respectively. Each of the memory cells includes a pair of transistors QO1 and Q11, load resistors R*c*1 are connected to the collectors of the respective transistors, and address lines AD1, ..., AD*n* are respectively connected to common junction points of the load resistors. The base of each one of the transistors QO1 and Q11 is cross-connected to the collector of the other transistor, respectively, while a resistor R*cc* for increasing the operating speed of the transistors QO1 and Q11 and for preventing their saturation is connected between the respective collectors. The respective emitters are connected to digit lines DL1, ....DL*m*, which are connected to sense amplifiers S1, ...., $Sm_D$.

The operation of the above construction will be described with reference to operational wave-form diagrams in FIGS. 2(*a*) and 2(*b*).

Figure 2A:
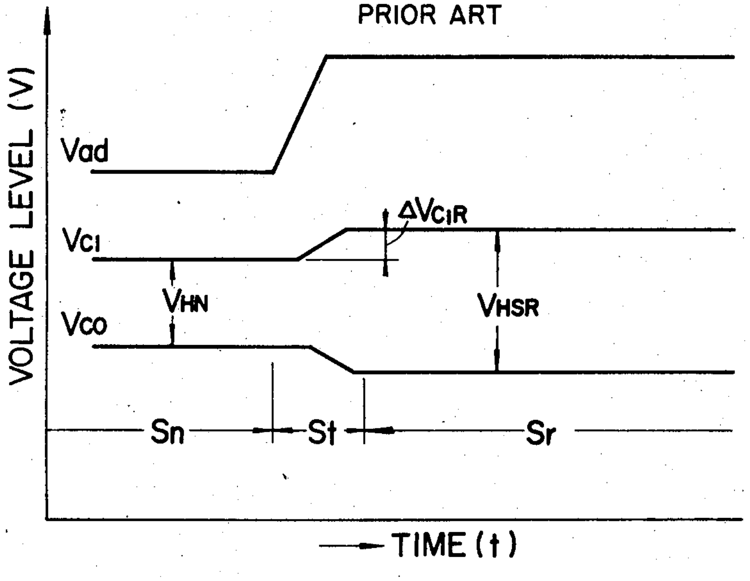
FIG. 2a PRIOR ART
FIGS. 2(*a*) and 2(*b*) show diagrams for explaining the operation of the prior art semiconductor memory shown in FIG. 1.
Figure 2B:
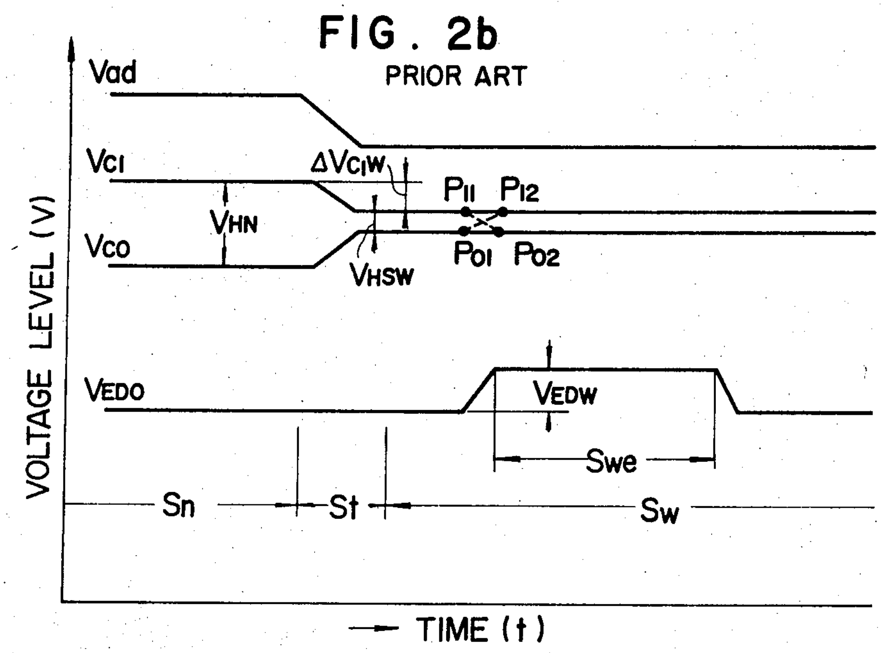
FIG. 2b PRIOR ART

FIG. 2(*a*) shows an operational wave-form diagram of the read-out state of the memory cell. The selection of the memory cell (the read-out state) is performed by raising a voltage V*ad* of one of the address lines AD1, ...., AD*n* above a level at the standby period (the non-selected state). In this case, all the memory cells connected to the address line are selected.

Assuming now that stored contents ( stored information ) in the memory cell M11 is read out, the voltage V*ad* of the address line AD1 has to have a level in the selected state S*r* raised from a level in the non-selected state S*n* as illustrated by FIG. 2(*a*), S*t* indicates a transient state between the non-selected state S*n* and the selected state S*r*.

If it is assumed that the storage be in a state in which the transistor QO1 of the memory cell M11 is "on" while the transistor Q11 if "off", then the respective collector voltages V*c*O and V*c*1 at the collectors of the transistors QO1 and Q11 in the non-selected state S*n* are as shown by FIG. 2(*a*) , and a potential difference of a holding voltage VHN appears therebetween.

The collector voltages V*c*O and V*c*1 vary in the selected state S*r* such that the latter is raised by ΔV*c*1R whereas the former is lowered, with the result that the holding voltage becomes VHSR ( VHSR > VHN ). Accordingly, as shown in FIG. 2(*b*) , a voltage VEDO at one of the digit lines DL1 is raised in response to the increase of the collector voltage V*c*1, DL1 is raised in response to the increase of the collector voltage V*c*1, while a voltage VED1 at the other line is not influenced by the lowering of the collector voltage V*c*O since the transistor Q11 is off. Hence, an output of, for example, 1 is obtained at a terminal VO1 from a transistor T1 of the sense amplifier S1, while an output of O is obtained from an output terminal VO2 of the other transistor T2. A change in the voltage VEDO at the digit lines DL1 in the selected state S*r* is in the same degree as the change ΔV*c*1R in the collector voltage V*c*1, and this change value is set to satisfy the relation as ΔV*c*1R < VHN in order that the stored contents in any of memory cells, e.g. M*n*1, in the non-selected state connected to the same digit lines, may be prevented from being destroyed.

Although the sense amplifiers are illustrated to have only the first stage in FIG. 1, usually they require a plurality of stages. Since fluctuations in the digit-line voltages are induced not only by the read-out operation but also by, e.g., stored contents in a plurality of memory cells connected to the digit lines, each sense amplifier is preferably constituted, in order to improve the S/N ratio ( S = read-out signal , N = noise ) , such that the output of the first-stage of the sense amplifier is coupled by capacitors to an amplifier at the next stage so as to amplify and take out only variations in the digit-line voltages at read-out.

The write-in operation will now be described with reference to the wave-form diagram shown in FIG. 2(*b*).

Assuming now that the voltage V*ad* at an address line be raised for write-in, the holding voltage reaches the value VHSR when in the write-in state ( corresponding to the selected state S*r* ) similar to the case shown in FIG. 2(*a*) , and it is higher than the holding voltage VHN in the non-selected state S*n*. Therefore, if the voltage VEDO at one of the digit lines DL1 is raised in that condition with the intention of reversing the relation in electric potential between the collector voltages V*c*1 and V*c*O for the write-in, it exceeds the storage holding voltage VHN in the non-selected state. As a result, the contents forced in other memory cells in the non-selected state, e.g. of M*n*1, are destroyed.

Accordingly, in the memory of this type, the write-in is carried out by making the voltage V*ad* of the address line in the write-in state S*w* lower than in the non-selected state S*n*. In this manner, the collector voltage V*c*1 in the write-in state S*w* is lowered by ΔV*c*1*w* while V*c*O is raised as is illustrated by FIG. 2(*b*) , and the storage holding voltage VHSW becomes smaller than the holding voltage VHN in the non-selected state S*n*. The value of ΔV*c*1*w* is selected to satisfy the relation $\Delta Vc1w$ < VHN so as to avoid destruction of stored contents of other memory cells.

When , in this state, the voltage VEDO at the digit line is changed by VEDW in the positive direction in a write-in instruction period Swe, the collector voltage VcO is transferred from a point PO1 to a point P12 while Vc1 is transferred from a point P11 to a point PO2 as is seen in FIG. 2(*b*) . Thus, the on and off states of the transistors QO1 and Q11 are inverted, that is, the stored contents are inverted. The above operations apply in quite the same way to other memory cells.

The semiconductor memory as described above is very excellent as a semiconductor memory of large capacity. On the other hand, however, a driving circuit therefor becomes complex since the direction of change of the address voltage at the address line is opposite between the read-out period and write-in period of the memory cell. Further, since the collector resistors of the two transistors of the memory cell are of fixed value, if the values thereof are made to be large in order to make low the power consumption of the memory cell, this renders it impossible to cause a large amount of current to flow for performing high speed operation at read-out and write-in. Still further, while the amplifiers are made into a multi-stage construction with the capacitor coupling therebetween in order to increase the S/N, it is very difficult to form the capacitors in integrated structure. Moreover, such a multi-stage construction should be designed in consideration of the band width of signals, so that the manufacture is complicated. The prior art semiconductor memory has such various disadvantages.

SUMMARY OF THE INVENTION

An object of the present invention is to provide a semiconductor memory which can be driven by a driving circuit of simple construction.

Another object of the present invention is to provide a semiconductor memory including memory cell or cells which operate at low power consumption and at high speed.

A construction of the present invention for accomplishing the above-mentioned objects is a semiconductor memory comprising a memory cell which employs two transistors and switched impedance elements connected to the respective collectors of the transistors, the collector and base of one of the transistors being cross-connected with the base and collector of the other of the transistors, respectively. The respective collectors are coupled through the switched impedance elements to an address line, the emitters of the transistors are coupled to digit lines, respectively, and the impedances of the switched impedance elements are varied between the selected and non-selected periods of the memory cells.

DETAILED DESCRIPTION OF THE INVENTION

The present invention will now be described in detail.

Figure 3:
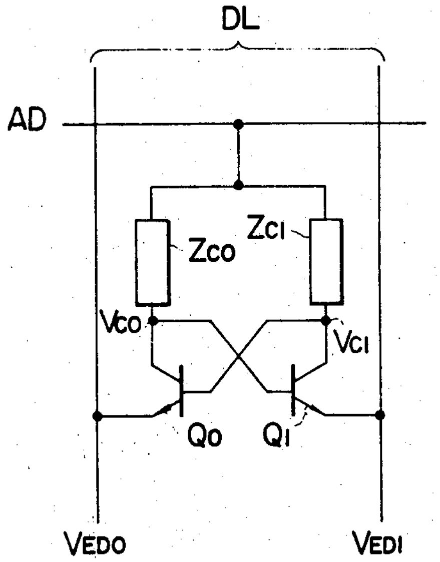
FIG. 3 and FIGS. 5 to 7 are diagrams showing the schematic constructions of the essential portions of the present invention.

FIG. 3 is a schematic view for explaining the fundamental principle of the present invention, which shows one memory cell and an address line AD and digit lines DL which are adapted to be connected to the memory cell. Since the associated peripheral circuits may be the same as those used with the prior art memory shown in FIG. 1, they are omitted herein. In FIG. 3, reference characters QO and Q1 designate transistors, the emitters of which are connected to the respective digit lines DL. The elements ZcO and Zc1 are switched impedance elements, which are connected in this embodiment between the collectors of the respective transistors QO, Q1 and the address line AD. The base of each transistor is connected crosswise to the collector of the other transistor. While the collectors and the bases of the transistors QO and Q1 may be directly cross-connected to each other, the cross connection may be made through a suitable level-shift circuit, e.g. a resistor. The switched impedance elements ZcO and Zc1 ( concrete examples being hereinafter referred to ) are those which present a high impedance value when an address voltage V*ad* applied thereto is of a low level ( the non-selected state ), but present a low impedance value when V*ad* is of a high level ( at the read-out or write-in state, which are hereinbelow generically referred to as "the selected state").

The operation of the above construction will now be explained.

Assuming now that the storage state of the memory cell as shown in FIG. 3 is the same as that of the memory cell M11 as illustrated in FIG. 1, the read-out operation of the embodiment will be described with reference to operating wave forms in FIG. 4(*a*). The voltage V*ad* at the address line AD is set such that the level thereof in the selected state S*r* is higher than that in the non-selected state S*n*. Then, since the transistor Q1 is in the off state, the collector voltage Vc1 thereof is raised by approximately $\Delta Vc1R$ in the same manner as in the memory cell in FIG. 1. On the other hand, since the transistor QO is in the on state, the collector voltage V*co* thereof is greatly increased. This is based upon the fact that, utilizing the change in the impedance value of the switched impedance element Z*co* from a high impedance value to a low one, the voltage drop across the switched impedance element is designed to be a small value. Accordingly, the storage voltage VHS in the selected state S*r* becomes smaller than the one VHN in the non-selected state S*n*. This is one of the remarkable fatures of the present invention, and makes it possible to drive the address line even at write-in as stated below, in the same manner as at read-out. In the non-selected state S*n* of the memory cell, the switched impedance element Z*co* and Zc1 ( the case of ZcO = Zc1 being included ) are designed to exhibit the high impedance values. Thus, the currents flowing through the emitters of the transistors may be limited to extremely small values and hence, the power consumption may be made small. On the other hand, in the selected state S*r*, the switched impedance elements Z*co* and Zc1 are designed to have low impedance values. Thus, the read-out current may be made large, so that a memory cell which can be operated at high speed may be realized. Moreover, since the current in the non-selected state of the memory cell is extremely small, the digit-line voltage at the selected period of a memory cell is hardly influenced by other memory cells in the non-selected state. The invention is accordingly advantageous in that the S/N ratio is enhanced, and that it eliminates the necessity for the troublesome means of the condenser coupling in the sense amplifier as required in the prior art. The switched impedance elements ZcO and Zc1 do not always exhibit the same impedance values with respect to each other when the memory cell is in the storage state. Further, on the basis of the fact that the impedances of the switched impedance elements become low at the selected state of the memory cell, the transient characteristic of the transition between the selected and non-selected states is improved. The read-out of stored contents by the sense amplifier can be made similarly as in the case of FIG. 1, and thus the explanation is omitted herein.

The write-in operation of the circuit shown in FIG. 3 will now be described with reference to FIG. 4(*b*). Since, as explained for the read-out operation, the storage holding voltage VHS in the selected state S*r* of the memory cell is smaller than the storage holding voltage VHN in the non-selected state S*n*, the write-in operation is possible in the selected state. Accordingly, the level of the voltage V*ad* at the address line AD at the write-in, that is, in the selected state S*w* is made higher than the voltage V*ad* at the address line AD in the non-selected state S*n*, while the voltage VEDO of one of the digit lines DL ( or VED1 in case where the conduction and non-conduction of the transistors QO and Q1 is opposite ) is changed by BEDW in the positive direction during the period S*we* of the write-in instruction. Thus, the collector voltage V*c*O level is shifted from a point PO1 to a point P12 and the collector voltage V*c*1 from a point P11 to a point PO2, thereby inverting stored contents. While VEDW > VHS should be of course, held in order to effect the write-in, the condition VEDW < VHN is further required in order that the stored contents of other memory cells in the non-selected state are connected to the same digit line may not be destroyed. Of course, the voltage VEDW is selected within such a range. In FIG. 4(*b*), VEDO is shown to slightly vary in response to the change in the voltage Vad at the address line AD. This is because the collector voltage V*c*1 of the transistor Q1 is raised by V*c*1*w*.

Figure 5:
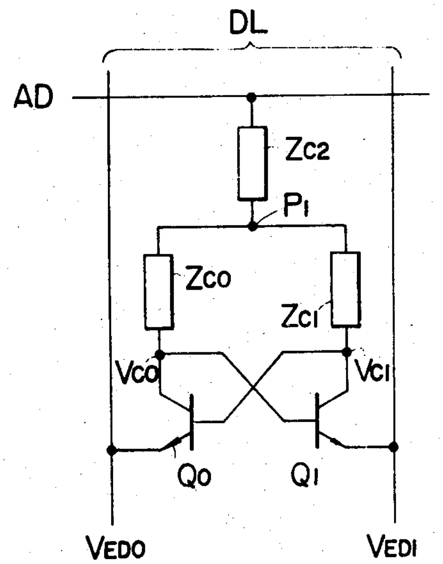
Figure 6:
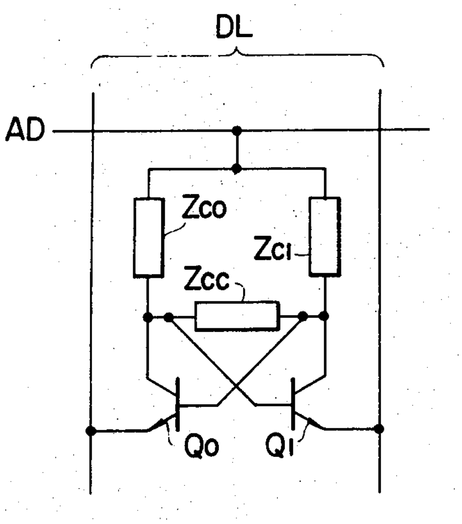
Figure 7:
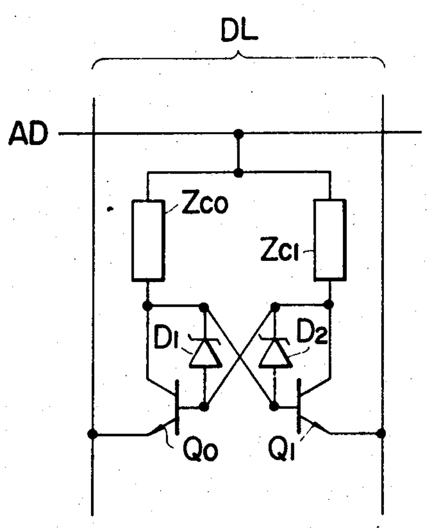

With the fundamental principle of the present invention as illustrated in FIG. 3, the impedance of the switched impedance elements Z*c*O and Z*c*1 being respectively connected to the collectors of the transistors QO and Q1 are changed between the non-selected state and the selected state of the memory cell, whereby the performance of the memory cell is sharply enhanced over the prior-art memory cell. However, in case where the transistors QO and Q1 are saturated, more improvements in performance may not be expected. FIGS. 5, 6 and 7 show circuit arrangements for preventing the transistors QO and Q1 from being saturated.

In the embodiment shown in FIG. 5, an impedance element Z*c*2 is incorporated between a common junction point P1 of the switched impedance elements Z*c*O, Z*c*1 and the address line AD. While the impedance of the impedance element Z*c*2 may be either fixed or variable, it should desirably be variable in order to make large the ratio of the current of the memory cell between in the non-selected period and in the selected period.

According to the circuit shown in FIG. 6, a coupling impedance Z*cc* for the prevention of the saturation is provided between the respective collectors of the transistors QO and Q1. The impedance of the coupling impedance Z*cc* may be either fixed or variable.

Further, the circuit shown in FIG. 7 is constructed such that Schottky barrier diodes D1 and D2 are connected between the collectors and bases of the respective transistors QO and Q1, respectively. Although the Schottky barrier diodes are difficult to manufacture in comparison with such elements as the transistors and the resistors, they are effective from the viewpoint of preventing the saturation of the transistors QO and Q1. The operation of the respective circuit arrangements is the same as in the principle circuit arrangement in FIG. 3.

Figure 8:
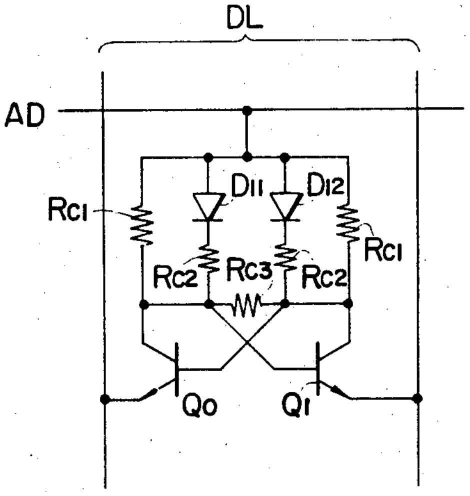
FIGS. 8 to 14 are circuit diagrams of the essential portions of concrete embodiments of the present invention.

FIG. 8 is a diagram showing a concrete embodiment of the present invention, wherein the same reference characters of various parts correspond to those in FIG. 3. The switched impedance element Z*c*O in FIG. 3 comprises a high value resistor R*c*1, and a series circuit which consists of a diode 11 and a low value resistor R*c*2 and which circuit is connected in parallel with the resistor R*c*1. The switched impedance element Z*c*1 comprises a high value resistor R*c*1, and a series circuit which consists of a diode D12 and a low value resistor R*c*2 and which circuit is connected in parallel with the resistor R*c*1. The reference character R*c*3 is a saturation-preventing resistor which corresponds to the impedance element Z*cc* illustrated in FIG. 6, and which is not necessarily required.

With the above construction, the voltage V*ad* at the address line AD, the resistance values of the resistors R*c*1 and R*c*2 and the characteristics of the diodes D11 and D12 are selected such that, at the non-selected period, the diodes D11 and D12 are in the non-conducting state or a state close thereto, i.e., such that the voltages across the diodes D11 and D12 do not exceed the threshold voltage of said diodes. In addition, they are selected such that, at the selected period, one or both of the diodes D11 and D12 are in the conducting state, i.e., such that the voltage across one or both of the diodes D11 and D12 exceeds the threshold voltage of the diodes. Accordingly, current flowing through the emitter is a small one prescribed by the high value resistors R*c*1 and R*c*3 at the non-selected period, whereas a large read-out current prescribed by the forward-direction characteristic of the diode D11 or D12 and the low value resistor R*c*2 flows at the selected period.

Figure 4A:
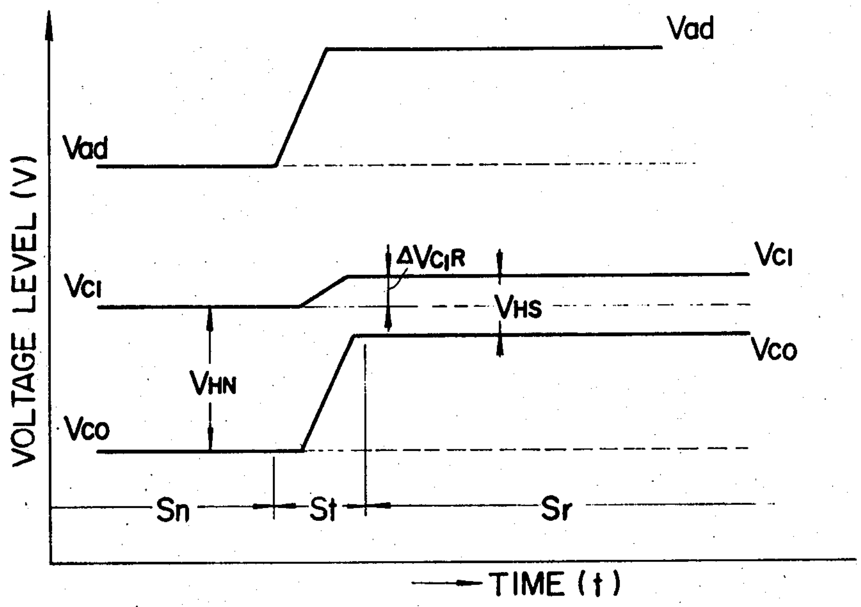
FIGS. 4(*a*) and 4(*b*) show wave-form diagrams for explaining the operation of the construction in FIG. 3.
Figure 4B:
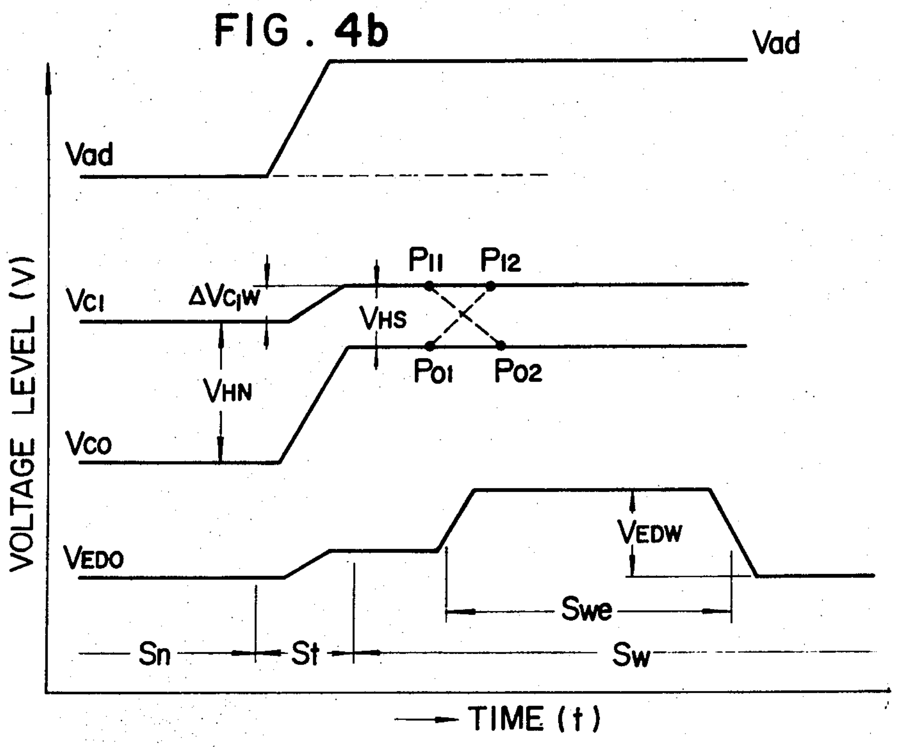

The wave forms of voltages and currents at the selected and non-selected periods of the memory cell are the same, in principle, as those illustrated in FIGS. 4(*a*) and 4(*b*).

Figure 9:
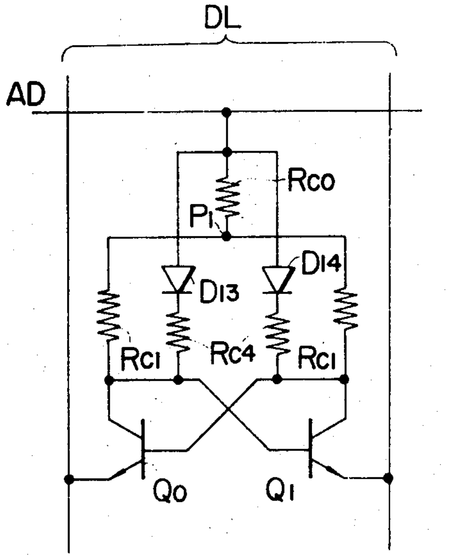

FIG. 9 is a circuit diagram showing a concrete embodiment of the circuit of the present invention as shown in FIG. 5. In the embodiment, high value resistors Rc1 are respectively connected to the collectors of the transistors Q0 and Q1, a resistor R*c*O for preventing saturation of the transistors QO and Q1 is connected between a common junction point P1 of the resistors Rc1 and the address line AD, and series circuits consisting of a diode D13 and a low value resistor R*c*4 or of a diode D14 and a low value resistor R*c*4 are connected between the address line AD and the collectors of the respective transistors.

With the above construction, the resistance of the respective resistors and the characteristics of the respective diodes are selected such that, at the non-selected period, the diodes D13 and D14 are in the non-conducting state or a state close thereto, whereas at the selected period, one or both of the diodes D13 and D14 is in the conducting state. The operation is similar to that of the foregoing embodiment.

Figure 10:
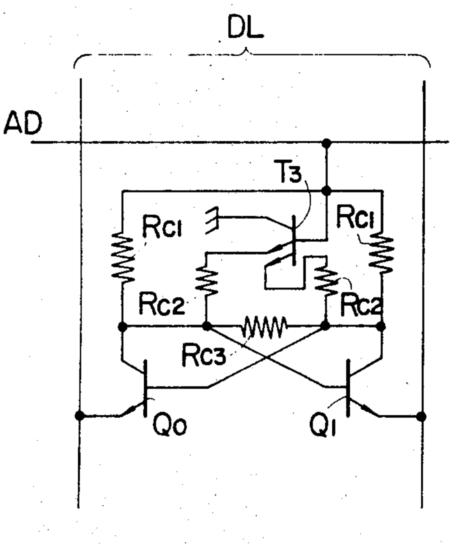

FIG. 10 is a circuit diagram showing another concrete embodiment of the present invention. In place of the diodes D11 and D12 in the embodiment illustrated in FIG. 8, a transistor T3 having a plurality of emitters is provided and the collector thereof is maintained at ground potential. The change-over operation between the high resistances Rc1 and the low resistances Rc2 at the non-selected state and selected state is effected by a control voltage which is applied to a base terminal of the transistor T3. Used as the control voltage applied to the base terminal is the voltage Vad at the address line AD, which is a voltage rendering the transistor T3 non-conductive at the non-selected state and rendering it conductive at the selected state.

Figure 11:
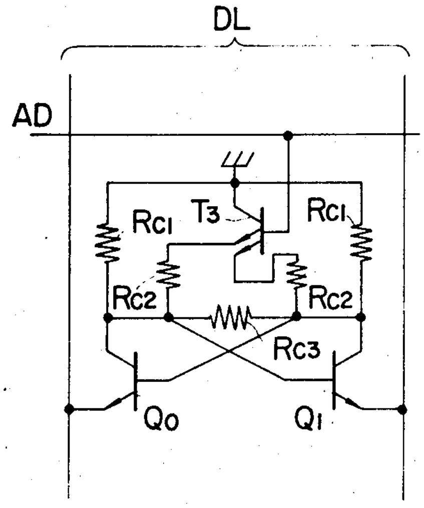

FIG. 11 shows an embodiment modifying part of the embodiment in FIG. 10. In the modification, the collector of the transistor T3 is grounded in common with one end of the resistors Rc1. The electric potential of the address line AD may merely be of such a voltage capable of causing the change-over in the state of the transistor T3, and, in this case, it needs not drive the collectors of the transistors QO and Q1. The selection and driving circuitry is accordingly simplified.

Figure 12:
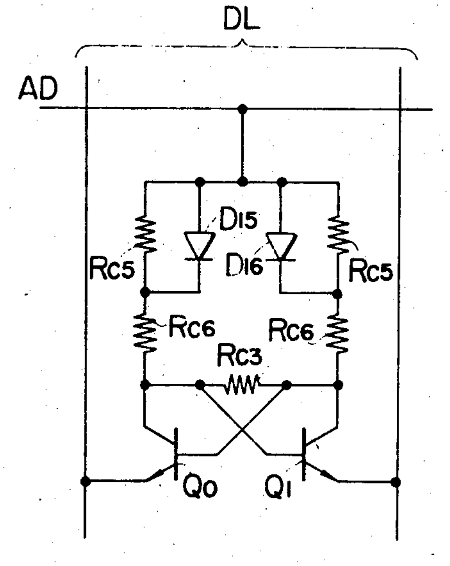

FIG. 12 is a circuit diagram showing still another embodiment of the present invention, in which switched load resistors for the transistors QO and Q1 are connected to the collectors of the transistors QO and Q1, each constituted by a series circuit consisting of a high value resistor Rc5 and a low value resistor Rc6 and by a diode D15 or D16 connected in parallel with the high value resistor Rc5.

Thus, the operation is made such that, at the non-selected state of the memory cell, the diodes D15 and D16 are in the non-conductive state or a state close thereto, whereas at the selected state, one or both of the diodes D15 and D16 become conductive. Accordingly, currents prescribed mainly by $Rc5 + Rc6 \approx Rc5$ ( since $Rc5 >> Rc6$) and Rc3 flow at the non-selected period, while those prescribed by the diodes D15 and D16 and the low value resistor Rc6 flow at the selected period. Of course, this embodiment is therefore operated similarly to the foregoing embodiments.

Figure 13:
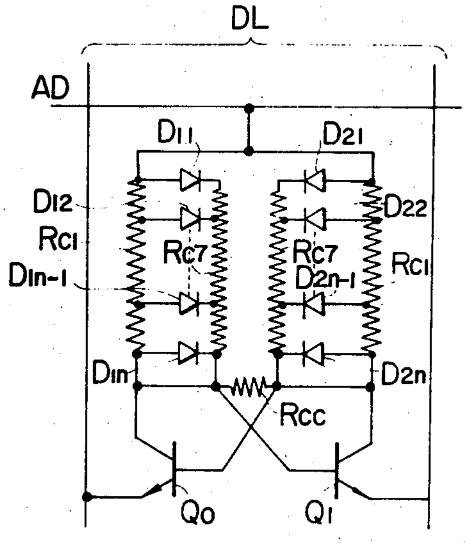
Figure 14:
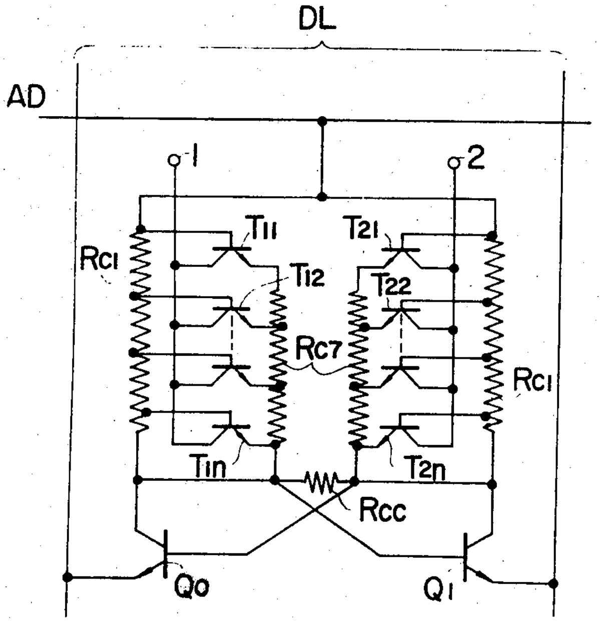

FIGS. 13 and 14 are circuit diagrams showing further embodiments of the present invention. In the circuit illustrated in FIG. 13, the switched impedance element connected to the collector of each of the transistors QO and Q1 is constituted by a network which comprises a high value resistor Rc1, a low value resistor Rc7, and a group of diodes D11, D12, ... D1*n* or D21, D22, ....D2*n* which are distributively present between the two resistors Rc1 and Rc7. The respective resistors Rc7 are connected at one end to the collectors of the transistors QO and Q1 and are coupled at the other end to the diodes D11 and D21, respectively.

With the above construction, the respective resistors, the diode characteristics, and the voltage levels are selected such that, at the non-selected state of the memory cell, almost all of the diodes D11, D12, ....D1*n* and D21, D22, ....D2*n* become non-conducting or a state close thereto, and that, at the selected state, at least those of the diodes which are closely connected to the address line AD e.g. one or both of the diodes D11 and D12, are brought into the conducting state.

FIG. 14 illustrates a case where, in place of the diodes D11, D12, .... D1*n* and D21,D22, ....D2 in FIG. 13, transistors T11, T12,.... T1*n* and T21, T22, ...., T2*n* are used. Terminals 1 and 2 are collector bias voltage source terminals for the respective transistors, and they are connected to separate constant-voltage sources. The switched impedance elements in which, as shown in FIGS. 13 and 14, diodes or transistors are distributively present between two resistors of different impedances, may be realized in a very small area by a semiconductor integrated circuit or the like, and is accordingly very effective.

While the above-described various memory cells have been explained as being usable instead of the memory cell of the semiconductor memory as illustrated in FIG. 1, a further embodiment of the present invention will now be explained with reference to FIG. 15.

In the figure, M11, ....M22 designate memory cells ( although, in general, *n* by *m* cells are included, a case of four cells is shown herein ) . While, in the present embodiment, the memory cell shown in FIG. 11 is employed, it is needless to say that memory cells other than this particular cell are applicable. AD1 and AD2 are two X-address lines, DL1 and DL2 are digit lines, and JOO and J01, J1 and J2 are current sources which cause currents Ir and IDS to flow through the digit lines at the selected and non-selected state, respectively. IR represents a current required for write-in or read-out operation, while IDS represents a current required for maintaining or holding the stored contents of the memory cells connected with non-selected digit line but with the selected X-address line. T30 , ....T33 represent transistors for selecting the digit lines, and the base terminals thereof are Y-address terminals Y1 and Y2 to which are applied Y-address selecting voltages. The memory cells M11, ....M22 are selected by applying a voltage to one of the X-address lines AD1 and AD2 and one of the Y-address terminals Y1 and Y2. The current sources J1 and J2 are respectively connected through diode pairs ( D30, D31 ) and (D32, D33 ) to the digit lines DL1 and DL2. The selecting transistors ( T30, T31 ) and ( T32, T33 ) for the Y-address lines are controlled by the levels of the Y-address voltage applied to the base terminals Y1 and Y2 thereof. The reference level thereof is determined by a voltage VBB applied to the base of a transistor T34 which is coupled to the respective emitters. Transistors T35 and T36 have the respective emitters connected to the respective emitters of transistors T30 to T33 which are connected to the respective digit lines, and in dependence upon whether voltages VwO and Vw1 applied to their bases are higher or lower than the voltages applied to the Y-address terminals Y1 and Y2, they prevent the current IR of the current sources JOO and JO1 from flowing to one of the selected digit lines, to thereby effect write-in of the memory cell. Transistors T37 and T 38 constitute a sense amplifier , and the stored contents of the selected memory cell are read out from the value of their collector output voltages VO1 and VOO. A transistor T39 serves to clamp the voltage VcL applied to the base thereof, so that voltages on the anode side of the diode pairs ( D30, D31 ) and (D32, D33), and accordingly, the voltages VEDO1, VED11 and VEDO2, VED12 at the digit lines DL1 and DL2 may be prevented from unnecessarily decreasing in the negative direction.

In order to reduce the power consumption of the semiconductor memory , it is desirable that the current sources JOO, JO1, J1 and J2 do not supply current when all the memory-cells M11, ....M22 in matrix are in the non-selected state, and that they supply current at the selected period. HOwever, since interruption of the current at the non-selected period will destroy the stored contents, the minimum current for holding storage is necessary. Currents Is1 and Is2 flowing through resistors Rs1 and Rs2 serve as such currents for the storage retention and, simultaneously, they are added with dummy currents for preventing misoperation and as stated below. In the case where the current sources J1 and J2 always supply current, the currents Is1 and Is2 are unnecessary. Currents ID1, ID2, ID3 , and ID4 respectively flowing through resistors RDO1, RD11, RDO2, and RD12 are the dummy currents, which prevent the misoperation of the memory cell in such a way that, upon a change in the stored contents in the memory cells connected to the digit lines DL1 and DL2, currents flowing through the diode pair ( D30, D31 ) or (D32, D33) become unbalanced, the resultant voltage difference appearing on the digit lines.

Figure 16:
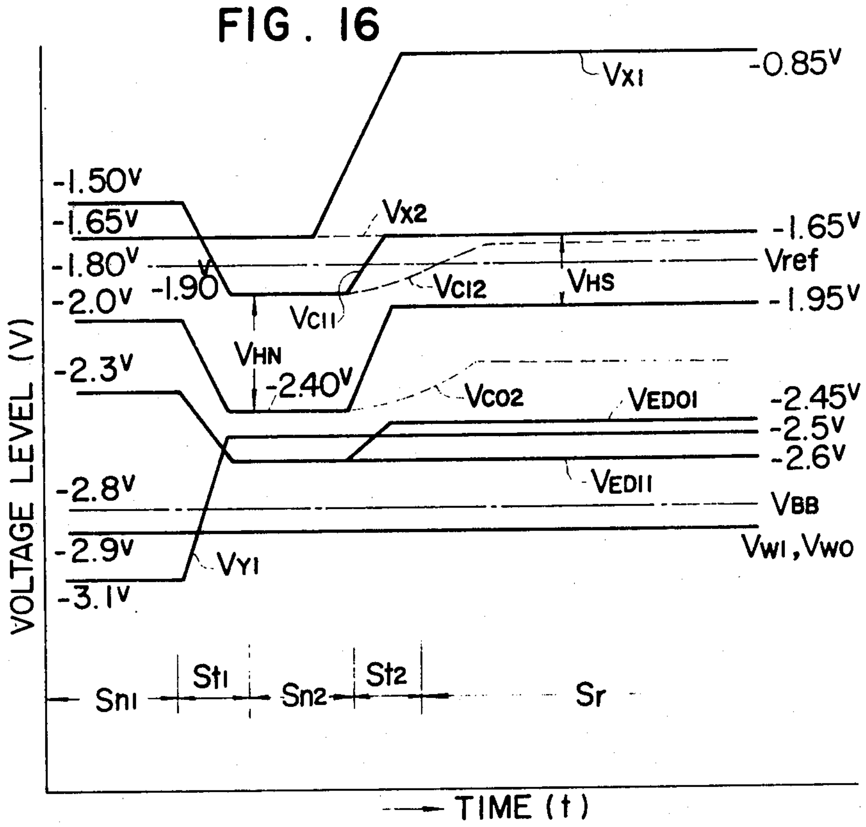

Description will now be made of the operation of the present embodiment. Assuming that, in the respective memory cells , the transistors QO1, QO2, QO3 and QO4 are in the on state ( this represents 1 ) while the transistors Q11, Q12, Q13 and Q14 are in the off state, and that read-out and write-in is attained in the memory cell M11 by selectively driving the X-address line AD1 and the Y-address terminal Y1. Examples of the voltage wave forms of various parts, in the case where the stored contents of the memory cell M11 are read out, are illustrated in FIG. 16. In the figure, Sn1 indicates the state in which neither the X-address nor the Y-address is selected, Sn2 represents the state in which only the Y-address is selected, and Sr represents the state in which both the X-address and the Y-address are selected, that is, the read-out state. St1 and St2 represent transient states between the respective states mentioned above. If, now, it is desired to transfer the non-selected state Sn1 into the state Sn2 with the only Y-address selected, by increasing the voltage level VY applied to the terminal Y1 as illustrated in FIG. 16, then the transistors T30 and T31 are rendered conductive, and collector voltages VcO1 and Vc11 of the transistors QO1 and Q11 and the digit-line voltages VEDO1 and VED11 are lowered. Next when a voltage Vx1 at the address line AD1 is raised at the read-out period Sr, then the transistor T3 is rendered conductive, the impedances of the aforesaid switched impedance elements connected to the collectors of the transistors QO1 and Q11 are reduced, and the collector voltages VcO1 and Vc11 and the digit-line voltage VEDO1 are raised. The digit-line voltage VED11, however, does not change since the transistor Q11 is off. Accordingly, the change in the digit-line voltage VEDO1 is compared with the reference voltage Vref applied to the base of the transistor T37 of the sense amplifier, and the collector output voltage VO1 of said transistor becomes high, i.e., the state 1 is read out. While the reference voltage Vref is at a level of −1.80 V in FIG. 16, the substantial reference voltage becomes appriximately − 2.5 V on account of the base-emitter forward-direction voltage drop of the transistor T37 ( usually, approximately 0.7V ) , and it is positioned between the digit-line voltages VEDO1 and VED11. At the read-out period, since both the collector voltages VcO1 and VcO2 are made so as not to exceed the base-emitter voltage drop ( the threshold voltage ) of the transistors Q11 and Q12 with respect to the digit-line voltage VED11, the transistors Q11 and Q12 are never made conductive, and the stored contents are never destroyed. The voltage of the digit lines DL2 connected to the other emitter of the corresponding one of the transistors T37 and T38 of the same amplifier is sufficiently high, so that it is not an obstacle to the read-out of the memory cell M11.

Figure 15:
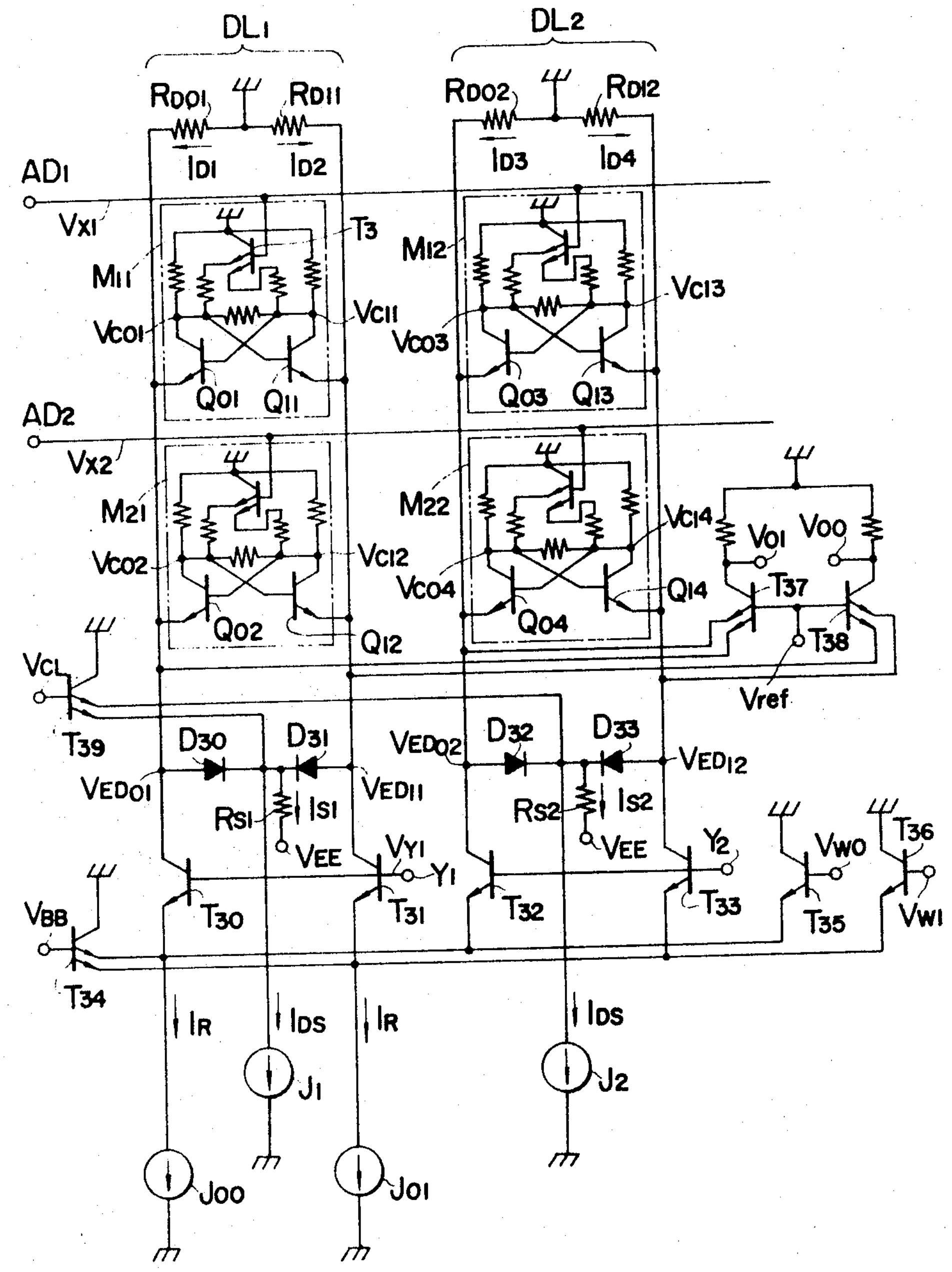
FIG. 15 is a circuit diagram showing a further embodiment of the present invention.
Figure 17:
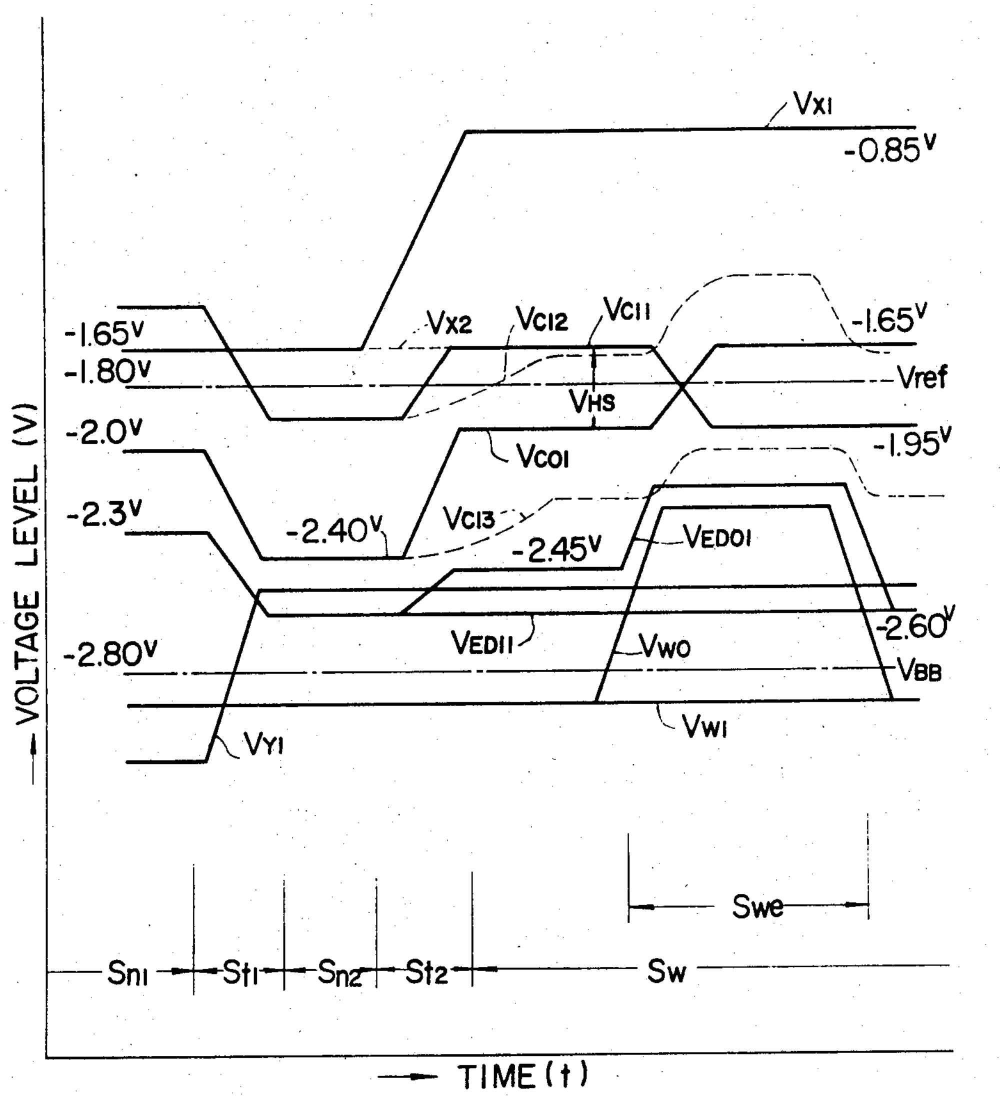
FIGS. 16 to 18 are wave-form diagrams for explaining the operation of the embodiment of the present invention shown in FIG. 15.

FIG. 17 is an operative wave-form diagram of various parts of the embodiment shown in FIG. 15 at the write-in period. The selection of the memory cell for the write-in is quite the same as in the case of the read-out described above, and the designations correspond to those of FIG. 16. A different point is that, in a write-in period Sw which corresponds to the read-out period Sr, the write-in is effect in a write-in instruction period Swe. More specifically, in the write-in instruction period Swe, a voltage VwO applied to the base of the transistors T35 and for the write-in to the memory cell M11 is raised. Thus, the level change of the voltage VEDO1 of the digit line exceeds the storage holding voltage VHS, the on and off states of the transistors QO1 and Q11 are inverted, and the stored contents are inverted.

Figure 18:
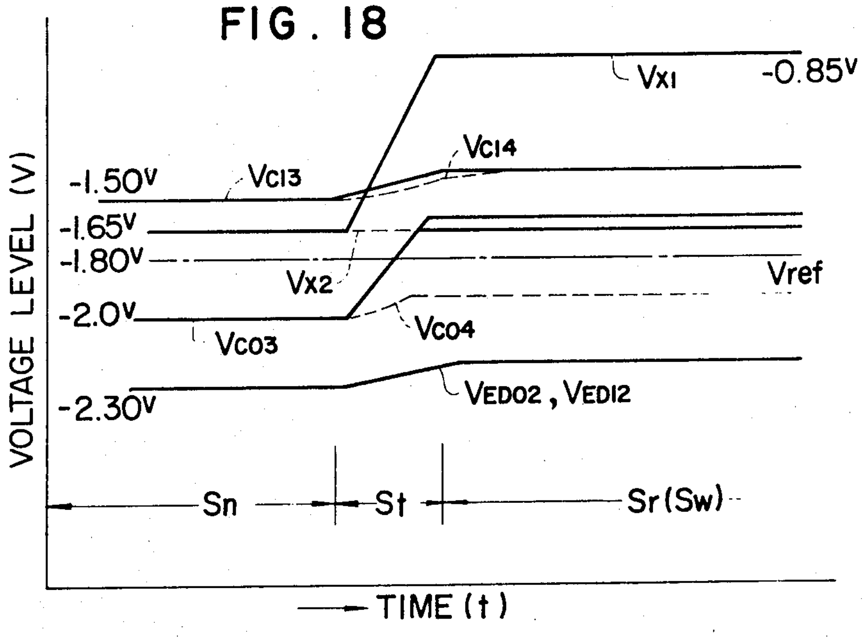

FIG. 18 shows changes-versus-time of voltage levels of the memory cell and of the digit lines which are associated with the digit lines DL2 during read-out or write-in-period of the memory cell M11. The voltage of the digit lines DL2 is a voltage of the sum between a voltage obtained by subtracting the base-emitter forward -direction voltage drop of the transistor T37 from the clamp voltage VcL, and the forward-direction voltage drop of the diodes D32 or D33. It is set to be higher than the value of the voltage VEDO1 of the digit lines DL1. The emitters of the transistors T37 and T38 connected to the digit lines are accordingly kept non-conducting. Since the collector voltages VcO3 and VcO4 of the memory cells M12 and M22 are so made that they are prevented from exceeding the base-emitter forward-direction voltage of the transistors QO3 and QO4 with respect to the digit-line voltage VED12, the stored contents of the memory cells M12 and M22 are never destoryed during the read-out and write-in of the memory cell M11.

The collector voltage VcO3 of the memory cell M12 has a tendency to increase due to an increase in the address voltage Vx1 the same as the other collector voltage Vc13. However, since the voltage VEDO2 at one of the digit line DL2 also increases, the cathode voltage of the diode D32 increases and, the current IDS of the current source J2 which has been flowing in one of the emitters of the clamping transistor T39 is switched to flow in the memory cell M12 through the diode D32. Although the resistance of the load resistor in the collector circuit of the transistor QO3 in the memory cell M12 has a relatively low value because it is in either read-out or write-in period, the current IDS produces a voltage drop across the load resistor, so that it suppresses a substantial increase in the voltage VcO3.

While, in the foregoing embodiments, the concrete embodiments constituting the variable impedances have been described as being suitable combinations between resistors and diodes or between resistors and transistors, it is understood that said switched impedances are not restricted thereto, but that two-terminal variable impedance elements such as of PNPN-type, field-effect transistors and the like elements may also be employed. In addition, it is of course, a matter of fact that the technique of the present invention is similarly applicable to a memory cell using the field-effect transistors.

We claim:

1. A semiconductor memory comprising:

a. at least one memory cell including 1. a pair of transistors each having a collector, a base and a single emitter,
2. means for connecting the collector of each transistor to the base of the other transistor, respectively, and
3. a pair of switched impedance elements connected, respectively, in the collector circuits of said pair of transistors, each of said switched impedance elements presenting a high or a low impedance value when an address voltage supplied thereto has a high or a low level, respectively;

b. a pair of digit lines coupled to said memory cell, said respective digit lines being connected to the respective emitters of said pair of transistors;

c. a collector bias source coupled to said memory cell for supplying a collector bias voltage to the collectors of said pair of transistors through said switched impedance elements, respectively; and d. address voltage supply means connected to said switched impedance elements for supplying to said switched impedance elements an address voltage of the high or low level when said memory cell is selected or non-selected, respectively, and for causing both said switched impedance elements to present said high impedance value when the address voltage supplied thereto has said high level, so that both the collector impedances viewed from the respective collectors into said switched impedance elements are concurrently provided at the low or the high value when the memory cell is selected or non-selected, thereby attaining high speed operation in said memory cell.

2. A semiconductor memory according to claim 1, wherein each said switched impedance element in each collector circuit comprises 1. a high value resistor having a high resistance value,
2. a low value resistor having a low resistance value, and
3. a switched element supplied with the address voltage and presenting a high or a low impedance value in response to a low or a high level of the applied address voltage for providing or not providing a low value resistor in shunt with each high value resistor when the switched element has a low or high impedance value, so that said collector bias source is connected to the collectors of said pair of transistors through said low value resistor when the address voltage has the high level or through at least said high value resistor when the address voltage has the low level, respectively.

3. A semiconductor memory according to claim 1, wherein said address voltage supply means comprises means for supplying an address voltage of the high level to said switched impedance elements, for the selected state, and further including means for increasing the voltage supplied to one of the digit lines of said pairs of digit lines, by an amount greater than difference between the voltages at the collectors of said transistors in the selected state but less than the difference between the voltage at the collectors of said transistors in the non-selected state.

4. In a semiconductor memory comprising:

a. at least one memory cell which includes 1. a pair of transistors each having a collector, a base and a single emitter, the collector of each transistor being connected to the base of the other transistor, respectively, and
2. a pair of collector load impedance elements connected at one end thereof to the collectors of said pair of transistors;

b. a collector bias source connected to the other end of said collector load impedance elements for supplying to the respective collectors of said pair of transistors a collector bias voltage;

c. a pair of digit lines connected to the respective emitters of said pair of transistors;

d. an address line coupled to said memory cell for supplying to said memory cell an address voltage having a first level by which said memory cell is rendered into a selected state and a second level by which said memory cell is retained in a non-selected state;

e. a signal read-out circuit connected with said digit lines for reading-out the stored contents in the memory cell when it is in the selected state; and f. a signal write-in circuit connected to each of said digit lines for writing-in information to be stored into the memory cell when it is in the selected state;

the improvement which comprises 1. a pair of switched impedance elements which serve as said collector load impedance elements, and each of which presents a low impedance value or a high impedance value in response to application thereto of the address voltage of the first level or the second level, respectively;
2. address voltage supply means for applying to said respective switched impedance elements concurrently the address voltage having the first or the second level depending on whether said memory cell is to be selected or non-selected, respectively, whereby both said collector load impedance elements concurrently present the low impedance value or the high impedance value when the memory cell is selected or non-selected, respectively; and
3. signal write-in voltage supply means for applying to one of the pair of digit lines a write-in voltage having a higher level than its normal level under the non-selected state when a signal is to be written into the memory cell.

5. An improvement in a semiconductor memory according to claim 4, which further comprises a coupling impedance element connected between the collectors of the pair of transistors for preventing said pair of transistors from saturating.

6. The improvement according to claim 5, wherein said coupling impedance element comprises a pair of Schottky barrier diodes connected in parallel with conductive directions opposite to each other.

7. The improvement according to claim 4, wherein each of said switched impedance elements comprises a high impedance element, a low impedance element and current control element which controls current flowing through the high impedance element to switch through the low impedance element in response to apply of the address voltage thereonto.

8. The improvement according to claim 7, wherein there is provided a double-emitter transistor, the respective emitters of which are connected in series with the low impedance element of the respective switched impedance elements, so that the double-emitter transistor serve as the current control elements, the base of said double-emitter transistor being connected with the address line so as to be supplied with the address voltage, and the collector of said double-emitter transistor being supplied with a collector bias voltage.

9. The improvement according to claim 7, wherein each of said switched impedance elements is formed by a parallel circuit of said high impedance element and a series circuit of said low impedance element and said current control element, and said address voltage is incorporated in a collector bias voltage and applied to the respective current control elements in the respective collector circuits of said pair of transistors.

10. The improvement according to claim 9, wherein said current control elements are diodes.

11. The improvement according to claim 9, which further comprises a coupling resistor connected between the collectors of said pair of transistors.

12. The improvement according to claim 7, wherein there is provided a double-emitter transistor having two emitters, a base and a collector, the respective emitters of which are connected in series with the low impedance element and serve as the current control elements, the collector of which is supplied with a collector bias voltage and the base of which is supplied with the address voltage.

13. The improvement according to claim 12, wherein the collector bias voltage supplied to the collector of the double-emitter transistor is constant.

14. The improvement according to claim 12, wherein the collector bias voltage supplied to the collector of said double-emitter transistor incorporates therein the address voltage and is thus variable in response to change in level of the address voltage.

15. A semiconductor memory comprising:

a. a memory matrix which includes
   1. a plurality of memory cells arranged in rows and columns into a matrix configuration, each of said memory cells comprising a pair of single emitter transistors and a pair of switched impedance elements connected in the respective collector circuits of said pair of transistors, respectively, said pair of transistors being coupled together in a manner that the collector of each transistor is connected to the base of the other transistor, respectively, and each of said switched impedance elements presenting a low or a high impedance value in response to the absence or presence of an address voltage supplied thereto,
   2. a plurality of address lines, each of which is coupled commonly to the memory cells located in the same row of the matrix, respectively, and
   3. a plurality of digit line pairs each including a pair of digit lines and correspondingly provided to the memory cells in each column in such a manner that the pairs of digit lines are commonly connected with the emitters of the respective pairs of transistors of the memory cells located in the same column of the matrix, respectively;
b. means for applying selectively a row selecting address voltage to one of said address lines;
c. means for applying selectively a column selecting address voltage to one of the digit line pairs;
d. first holding means provided between the pair of digit lines in each digit line pair for preventing information stored in the respective memory cells from being destroyed when no row selecting address voltage and no column selecting address voltage are applied to the memory matrix;
e. second holding means provided between the pair of digit lines in each digit line pair for preventing information stored in the memory cells located in the selected row and in the non-selected columns from being destroyed,
f. first and second current sources, the former being connected commonly to one of the pairs of digit lines of the respective digit line pairs and the latter being connected commonly to the other one of the pairs of digit lines of the respective digit line pairs, respectively, for flowing currents in the respective digit lines;
g. a pair of information write-in means, one of which is connected commonly to one of the pairs of digit lines of the respective digit line pairs and the other of which is connected commonly to the other one of the respective digit line pairs, for applying a write-in voltage representing information to be stored in the associated digit lines; and
h. information read-out means connected between the pairs of digit lines of the respective digit line pairs for reading-out information stored in the memory cell selected.

16. A semiconductor memory according to claim 15, wherein each pair of switched impedance elements comprises a double-emitter transistor having two emitters, a base and a collector, the respective emitters of which are connected in series with respective low impedance elements, each of which is connected to the collectors of each of said transistors of said pair of transistors, and the collector of said double-emitter transistor being connected to respective high impedance elements, which are also connected to the collectors of the transistors of said pair, the connection points between the collector of said double-emitter transistor and said high impedance elements being connected to a source of reference potential.

17. A semiconductor memory according to claim 16, wherein said address lines are connected to the bases of said double-emitter transistors within each of said memory cells.

18. A semiconductor memory according to claim 17, wherein said means for applying selectively a column selecting address voltage to one of said digit line pairs, comprises respective pairs of transistors, each transistor of said pair of transistors within said selectively applying means being connected to a respective one of said digit lines in said digit line pairs, and having said column selecting address voltage applied in common to the bases thereof.

19. A semiconductor memory according to claim 18, wherein said pair of information write-in means comprises a pair of input transistors, the emitters of which are connected commonly to the respective ones of the pairs of digit lines and to the bases of which are applied the write-in information.

20. A semiconductor memory according to claim 18, wherein said information read-out means comprises a sense-amplifier including a pair of multi-emitter transistors, the bases of which are connected in common to a source of reference potential and the respective multiple emitters of which are connected to respective common ones of said digit line pairs of said respective memory columns, the collectors of said pair of multi-emitter transistors of said sense amplifier providing the information to be read out from the memory cell which has been selectively addressed.

21. A semiconductor memory according to claim 20, including current sources respectively connected to the digit lines in respective columns through pairs of diodes connected between said current sources and each line in respective lines of digit lines in said columns.

22. A semiconductor memory according to claim 21, including a clamping transistor having a multi-emitter configuration, the respective emitters thereof being connected to the junctions of said respective diode pairs connected to said respective current sources, and to the base of which is connected a clamping voltage.

23. A semiconductor memory according to claim 22, wherein said means for applying selectively a column selecting address voltage to one of the digit line pairs further includes a reference level transistor having a multi-emitter configuration, the respective emitters of which are connected to respective pairs of digit lines in said respective columns, the reference voltage being applied to the base of said reference level transistor.

24. A semiconductor memory comprising:

a. at least one memory cell including a pair of single emitter transistors and a pair of load impedance elements connected to the collectors of said pair of transistors, respectively, the collector of each said transistor being connected to the base of the other transistor, respectively;

b. a source for flowing currents in said pair of transistors through the respective load impedance elements;

c. a pair of digit lines connected to the emitters of said pair of transistors, respectively;

d. an address line connected to said collector load impedance elements;

e. an information write-in circuit connected to said digit lines for supplying a raised write-in voltage representing information to be stored to said pair of transistors;

f. an information read-out circuit connected to said digit lines for deriving output signals from said memory cell; and g. an address circuit connected to said address line for applying an address voltage to said load impedance elements concurrently only when said address line is required to be selected, characterized in that said address circuit applies to said address line the address voltage of a high level when both the information write-in operation and the information read-out operation are required, and each of said pair collector load impedance elements is constituted by a switched impedance element which operatingly presents a low or a high impedance value in response to whether the address voltage is applied thereto or not, respectively, whereby high speed operation of said memory can be attained.

25. In a storage cell having two cross-coupled single emitter transistors each being provided with a high impedance load in its collector circuit and with a pair of digit lines at the emitter of the respective transistors, so as to form a bistable circuit with a storage state, a read cycle and a write cycle, the improvement which comprises:

a pair of semiconductive switched impedance elements which are operatively rendered in a high or a low impedance state in response to an address voltage applied thereto of a low or a high level for providing a low impedance path in shunt with each impedance load when said switched impedance elements are in the low impedance state; and bilevel source means for supplying the address voltage of the high or the low level when the cell is to be selected or non-selected, respectively, and for rendering both said switched impedance elements in the high impedance state when said cell is in its non-selected state and at least one of said switched impedance elements in the low impedance state when said cell is in the selected state.

26. A semiconductor memory comprising:

a. at least one memory cell including 1. a pair of single emitter transistors each having a collector, a base and a single emitter, the collector of each transistor being connected to the base of the other transistor, the emitters of the pair transistors being connected to a pair of digit lines, and 2. load means connected in the collector circuit of each transistor, said load means including a high impedance load connected to the collector of each said transistor for providing high impedance collector loads for the transistors, and a switched impedance element in shunt with each of said high impedance collector loads for providing a low impedance path around each high impedance collector load when the switched impedance element is rendered conductive, by being supplied with the address voltage of the high level;

b. source means for providing a collector voltage to the collectors of the respective pair transistors through the load means, respectively; and c. address means for providing the address voltage of the high or the low level to said switched impedance elements, so that both said switched impedance elements are rendered non-conductive when the address voltage applied thereto is at a low level and at least one of said switched impedance elements is rendered conductive when the address voltage applied thereto is at a high level.

27. The semiconductor memory of claim 26, wherein both said switched impedance elements are rendered conductive when the address voltage supplied thereto is at a high level.

28. The semiconductor memory of claim 26, wherein said switched impedance elements are both forward biased diodes.

29. The semiconductor memory of claim 26, wherein said switched impedance elements are constituted of a multi-emitter transistor having two emitters each connected to the collector of each transistor, a base supplied thereto with the address voltage, and a collector connected to said source means.

* * * * *